United States Patent [19]
Holehan

[11] Patent Number: 6,043,809
[45] Date of Patent: Mar. 28, 2000

[54] COMPUTER KEYBOARD SCROLL BAR CONTROL

[75] Inventor: Steven D. Holehan, Magnolia, Tex.

[73] Assignee: Compaq Computer Corporation, Houston, Tex.

[21] Appl. No.: 08/935,721

[22] Filed: Sep. 23, 1997

[51] Int. Cl.[7] .................................................. G09G 5/00
[52] U.S. Cl. ........................... 345/168; 345/169; 345/173
[58] Field of Search ..................................... 345/173–178, 345/168, 169

[56] References Cited

U.S. PATENT DOCUMENTS

| | | | |
|---|---|---|---|
| 5,327,161 | 7/1994 | Logan et al. ............................. | 345/157 |
| 5,748,185 | 5/1998 | Stephan et al. ......................... | 345/173 |
| 5,859,629 | 1/1999 | Tognazzini ............................... | 345/173 |
| 5,901,292 | 5/1999 | Nishigaki et al. ...................... | 710/103 |

*Primary Examiner*—Richard A. Hjerpe
*Assistant Examiner*—Benjamin D. Bowers
*Attorney, Agent, or Firm*—Conley, Rose & Tayon, P.C.; Michael F. Heim; Jonathan M. Harris

[57] ABSTRACT

A computer system includes one or more scroll bar sensors for scrolling up and down and left and right in a document or data displayed on the computer's display. The scroll bar sensors include capacitive touchpad sensors and are coupled to an electrical circuit. Localized capacitance charges are caused by the placement of an operator's finger on or near the sensor. These capacitance variations are processed by the electrical circuit to determine the location of the operator's finger on the scroll bar sensor. An operator can cause the computer system to display any section of a document or data by touching different portions of a scroll bar sensor. The computer system 100 also can determine relative motion of the operator's finger as the finger moves from one end of a scroll bar sensor to another end, thereby causing the computer to scroll through the document at a rate proportional to the operator's finger motion.

12 Claims, 3 Drawing Sheets

COMPUTER KEYBOARD SCROLL BAR CONTROL

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to an input control device for a personal computer. Still more particularly the present invention relates to a scroll bar control using a capacitive touch pad.

2. Background of the Invention

The complexity of functions performed by personal computers ("PC") has created a need for more sophisticated input and output devices for controlling the operation of the computer. For example, the mouse was developed to facilitate control of the movement of a cursor on the computer screen. Other input devices for controlling a cursor such as the track ball and joys tick are widely available.

Because of the limited size of a computer display, a computer operator typically can not view on entire document or spreadsheet on the display at one time. Rather, the operator must "scroll" through the document to view various portions of the document. Scrolling usually includes the ability to scroll up and down through a document, as well as left and right. Many software programs include one or more scroll bars to allow the computer operator to view various portions of the data not currently view able on the display. Thus, by implementing scroll bars, word processing and spread sheet programs, for example, allow entry and viewing of more data than can be seen on the display at any one point in time. Referring to FIG. 1, a typical word processing program 112 includes an up/down scroll bar 114 and a right/left scroll bar 116 to allow the operator to view different portions of the document. Usually a mouse (not shown) is used to adjust the scroll bar to view different portions of the data.

Although widely accepted, this method of using screen-based scroll bars for controlling which data or portion of a document is viewed on the display at any one point in time has certain drawbacks. For example, if an operator desires to highlight or block a section of a document that spans multiple screens, the operator first positions the cursor using the mouse at the beginning of the section to be blocked. Then, by pressing and holding a button on the mouse, the operator repositions the cursor at the end of the section to be blocked. If the end of the section to be blocked is in a portion of the document that is not currently displayed on the display, the operator will have to use the mouse to move the cursor over to the up/down scroll bar to move the currently viewed section of the document up or down to the portion of the document at which the end of section to be blocked is located. At this point, and usually in conjunction with another key on the keyboard such as the SHIFT key, the operator positions the cursor at end of the section to be blocked and presses the SHIFT key simultaneously while moving the cursor to the end of the section to be blocked. Alternatively, once the beginning of the section to be blocked is established by moving the cursor to that point using the mouse, the cursor can be moved to the top or bottom of the screen. Once the cursor is at the top or bottom of the screen, the displayed document will automatically scroll up or down until the operator finds the end of the section to be blocked. Often, however the end of the section to be blocked is only two or three lines below the bottom of the screen. It may be difficult, however, for the operator to scroll down only two or three lines with the automatic scroll feature provided in many computers because the automatic scrolling feature usually moves through the document faster than the response time of the operator. Thus, by the time the operator stops the scrolling feature, the computer may have scrolled down one or more screen's worth of information, thereby skipping over the desired end of section of text. Further, it may be cumbersome for an operator to use the mouse to reposition the cursor within a document, and concurrently also using the mouse to scroll up and down and right and left within the document using the screen-based scroll bars.

Additionally, many operators have a keyboard tray in which the keyboard resides for easy use. The mouse, however may be located on the table or desk next to the monitor. In such situations, the operator must lean forward in an uncomfortable position to reach the mouse. Moreover, although screen-based scroll bars controlled by pointing devices such as a mouse or track ball provide an efficient technique for viewing sections of a document or data not currently displayed on a computer monitor, there are certain draw backs with such a scrolling system.

SUMMARY OF THE INVENTION

The deficiencies of the prior art described above are solved in large part by a computer system including a plurality of scroll bar sensors. The scroll bar sensors preferably include capacitive touchpads. A pointer such as the computer operator's finger, creates localized changes in capacitance of the capacitive touchpads when the pointer is on or near each scroll bar sensor. A detection circuit coupled to the scroll bar sensors determines the location of the pointer on the scroll bar sensor and changes the information displayed on a computer display in response. Further, by moving the pointer across the scroll bar sensor from one end of the sensor to the other, the operator can cause the displayed information to scroll up or down or left or right depending on the relative motion of the pointer across a sensor. In accordance with a preferred embodiment of the invention, a left/right scroll bar sensor is included for controlling the left and right scrolling function of the computer system. Additionally, an up/down scroll bar sensor is provided to control scrolling up and down. The detection circuit can also determine the speed of the pointer as it moves across a scroll bar sensor and adjust the rate of scrolling through a document in proportion to the speed of the pointer.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of a preferred embodiment of the present invention, reference will now be made to the accompanying drawings, wherein.

DETAILED DESCRIPTION OF A PREFERRED EMBODIMENT

Figure 1:
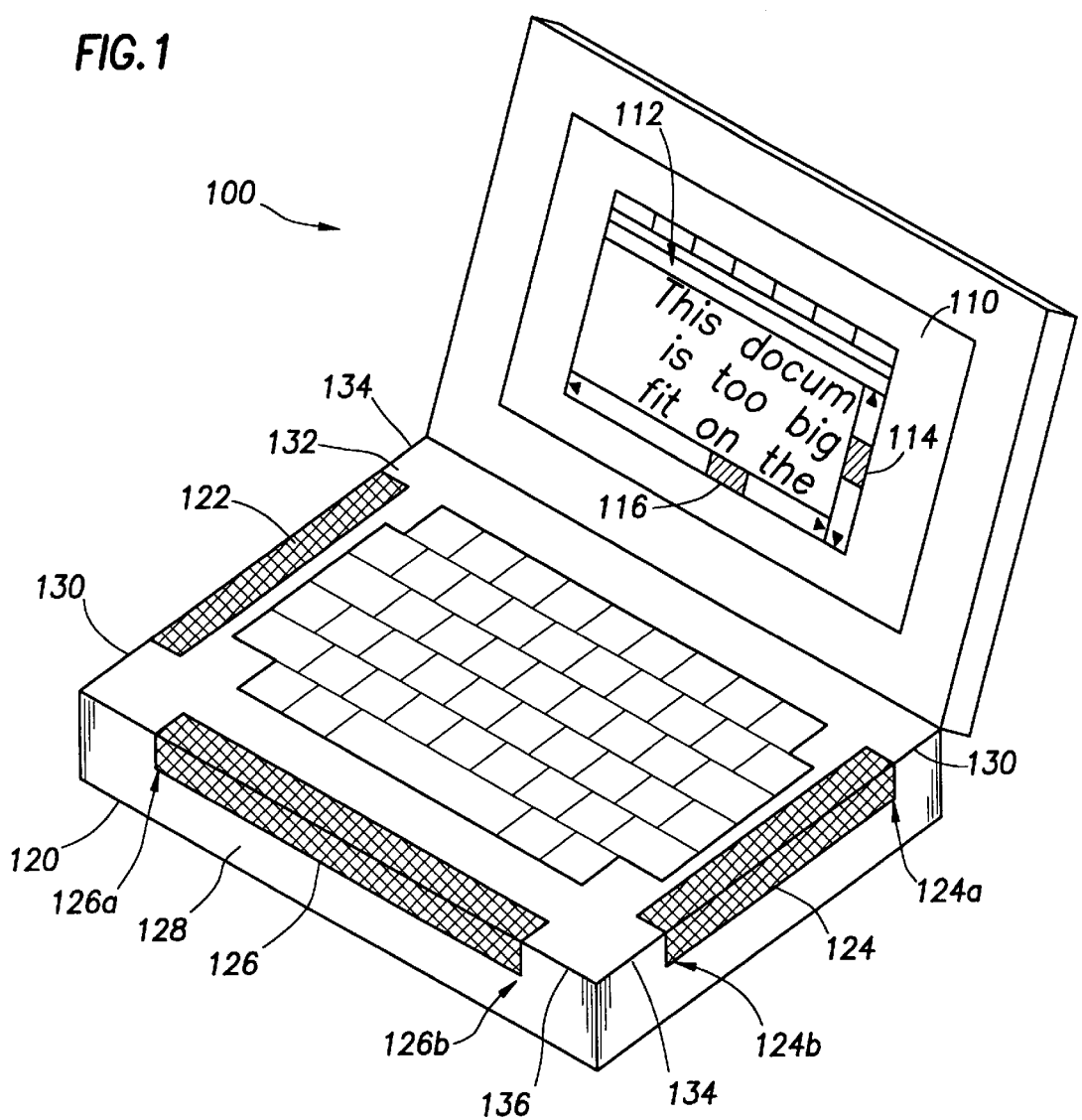
FIG. 1 is an isometric view of a portable computer constructed in accordance with a preferred embodiment of the invention.
Figure 2:
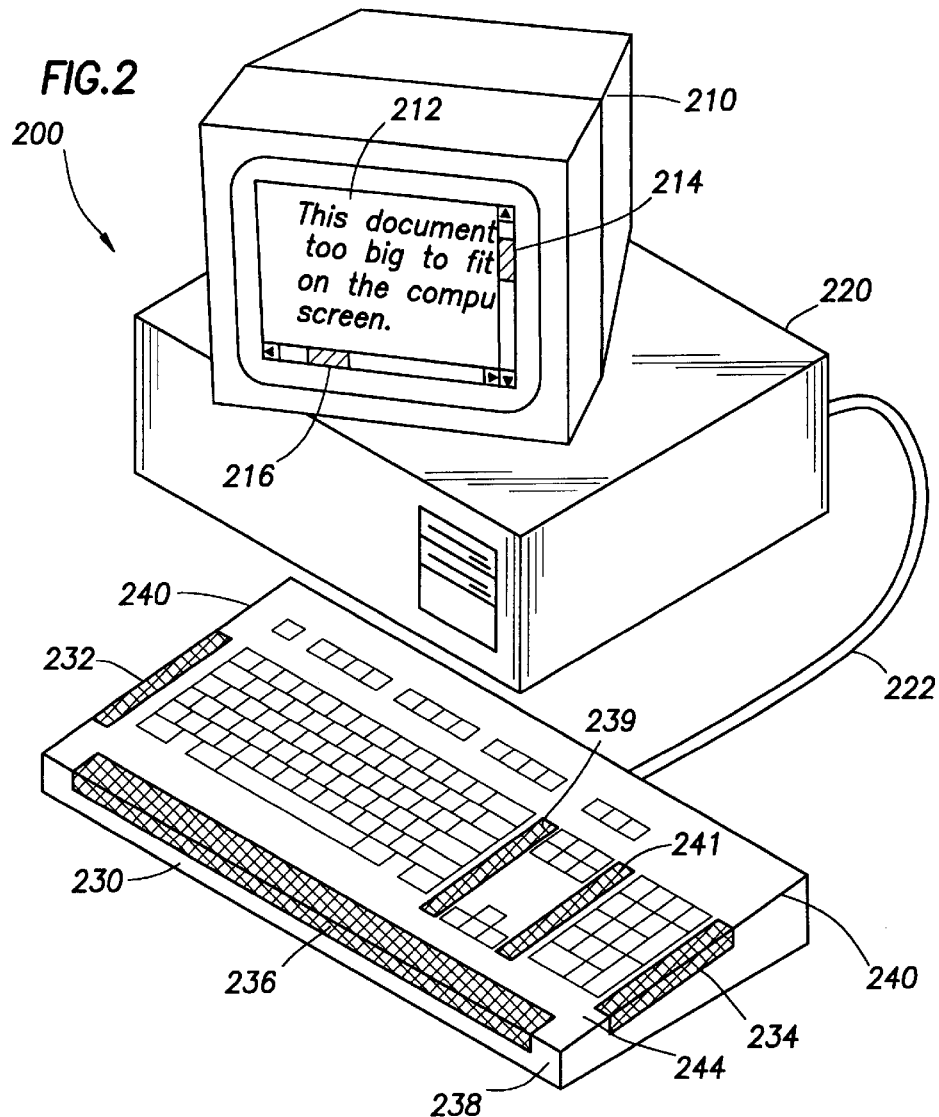
FIG. 2 is an isometric view of a desktop computer constructed in accordance with a preferred embodiment of the invention.

Exemplary embodiments of the invention are illustrated in FIG. 1 with respect to a lap top or portable computer system 100 and in FIG. 2 with respect to a desk top computer system 200. According to standard convention, computer systems 100 and 200 include a microprocessor and other known components.

Referring now to FIG. 1, computer system 100 includes a display device 110 and a keyboard unit 120. An exemplary computer program 112 is shown on display 110. As shown, the exemplary computer program 112 comprises a word processing program, although the invention is useful with any computer program that uses one or more scroll bars. As is typical with many word processing programs, computer program 112 includes two scroll bars 114 and 116. Scroll bar 114 comprises an up and down scroll bar for scrolling up or down through a document. Similarly, scroll bar 116 comprises a right and left scroll bar for scrolling to the right or to the left in a document. By using scroll bars 114, 116, an operator can view any portion of a document not currently displayed on the display 110.

Keyboard 120 preferably includes a top surface 132, side surfaces 130, and a front surface 128. Side edges 134 separate side surfaces 130 from top surface 132. Similarly, front edge 136 separates front surface 128 from top surface 132. In addition to, or in place of, scroll bar 114, 116 in computer program 112, keyboard 120 includes scroll bar sensors 122, 124, and 126. Scroll bar sensors 122 and 124 comprise up and down scroll bar sensors and are formed on the left and right edges, respectively, of keyboard 120. Further, up and down scroll bar sensors 122, 124 are disposed around edges 134 so that portions of the scroll bar sensors are disposed on the top surface 132, as well as the side surfaces 130. Scroll bar sensor 126 preferably comprises a left and right scroll bar sensor and is formed partially on the top surface 132 and on the front surface 128 of keyboard 120, thereby wrapping around front edge 136 similar to up/down sensors 122, 124. An operator accordingly can use either the portions of the sensors on the top surface 132 or the sensor portions on the front or side surfaces 128, 130.

The configuration of the scroll bar sensors 122–126 in FIG. 1 is an exemplary configuration only, and other configurations are consistent with the invention. For example, up and down scroll bar sensors 122, 124 need not wrap around side edges 134 of keyboard 120. Accordingly, scroll bar sensors 122, 124 may be disposed solely on the top surface 132 or solely on the side surfaces 130 of keyboard 120. Similarly, left and right scroll bar sensor 126 may be formed only on the top surface 132 or on the front surface 128 of the keyboard 120. Further still, scroll bar sensors 122–126 may be located at different positions on the keyboard 120.

In accordance with a preferred embodiment of the invention, scroll bar sensors 122–126 comprise capacitive touch pad sensors. As will be explained in more detail below with respect to FIGS. 4 and 5, capacitive touch pad sensors generally includes two sets of conductive traces connecting capacitive elements. The conductive traces usually run in orthogonal directions with respect to each other formed on a top and bottom surface of a substrate. A pointer placed near or in contact with the capacitive touch pad sensor causes a localized change in the capacitance of the capacitive touch pad sensor. Electronics coupled to the capacitive touch pad sensors detects the localized change in the capacitance of the capacitive touch pad sensor and determines the x and y location of the finger on the touch pad sensor. U.S. Pat. No. 5,374,787, incorporated herein by reference, is an exemplary reference that includes a more detailed description of a capacitive touchpad sensor. Accordingly, computer system 100 can determine the location of an operator's finger placed on scroll bar sensors 122–126.

An operator can scroll up and down and left and right through a document preferably by placing a pointer such as a finger, on or near the up/down scroll bar sensors 122–124 and left/right scroll bar sensor 126. Thus, if an operator desires to view the top of a document, he or she can touch the top portion 124a of scroll bar sensor 124. In response, computer system 100 will cause the beginning section of the document to be viewed on the display 110. Similarly, in response to the operator touching the bottom portion 124b of up/down sensor 124, the computer system 100 will cause the end section of the document to be displayed on display 110. Similarly, by touching the left portion 126a of left/right scroll bar sensor 126, the computer system will display the left portion of the document, and by touching the right portion 126b of left-right scroll bar sensor 126, the computer system will display the right portion of the document. Moreover, by touching any location between the end portions of the scroll bar sensors 122–126, the computer system 100 will display the portion of the document corresponding to the relative locations within the sensors touched by the operator.

Alternatively, if an operator wishes to continuously scroll through a document, rather than jumping to a particular point within a document as described above, the operator can place a finger near one end of a scroll bar sensor and move the finger towards the other end of the scroll bar sensor. In response, the computer system 100 calculates the speed at which the operator moves his finger along the scroll bar sensor. If desired the computer system 100 will scroll through the document at a speed proportional to the speed at which the operator moved his or her finger along the scroll bar sensor. Thus, the operator is advantageously afforded easy control over the rate of scrolling.

After an operator causes the computer system 100 to begin scrolling at a rate proportional to the speed of the operator's finger movement along a scroll bar sensor, the operator may remove his or her finger from the vicinity of the sensor. The computer system 100 may be configured, if desired, to continue scrolling at the same rate even once the operator's finger has been removed from the sensor. The computer will continue to scroll through the document for a predetermined period time or until another event occurs, such as again touching the scroll bar sensor or pressing another key on the keyboard. The computer system may also be programmed to stop scrolling, once scrolling is initiated, if the operator does not remove his or her finger from the vicinity of the scroll bar sensor leaving his finger stationary on the sensor.

Two up/down scroll bar sensors 122, 124 are included on the keyboard 120 of the computer system 100 in FIG. 1. In accordance with a preferred embodiment, both scroll bars 122, 124 are used interchangeably. Accordingly, a person who prefers to use his or her right hand to control an input device may prefer to use up/down scroll bar sensor 124 on the right side of computer system 100. However, a person who prefers to use his or her left hand may use the up/down scroll bar sensor 122 on the left side of the computer. L,eft side up/down scroll bar sensor 122 preferably functions in the same manner as right side sensor 124 described above.

Referring now to FIG. 2, a desktop computer system 200 includes a chassis 220, a monitor 210, and a keyboard 230. The exemplary computer program 212 shown on the computer monitor 210 includes an up/down scroll bar 214 and a left/right scroll bar 216. Keyboard 230 includes a top surface 244, a pair of side surfaces 240. and a front surface 238. Keyboard 230 preferably includes scroll bar sensors 232, 234, 236, 239 and 241. Although five scroll bar sensors are included on keyboard 230 in FIG. 2, fewer or more scroll bar sensors may be included as desired. Scroll bar sensors 232, 234, 239 and 241 may be implemented as up/down scroll bar sensors and maybe used interchangeably with each other. Alternatively, each scroll bar sensor may perform a different function as dictated by the way in which the operator programs the computer system or as determined by factory configuration. Scroll bar sensor 236 preferably comprises a left/right scroll bar sensor. Scroll bar sensors 232, 234, 236, 239, 241 control the scrolling feature of computer system 200 in the same manner as scroll bar sensors 122, 124, 126 described above regarding the computer system 100 of FIG. 1. Accordingly, the use of sensor 232, 234, 236, 239, 241 to scroll control devices is not discussed in detail herein.

It should be recognized that because the scroll bar sensors described in FIGS. 1 and 2 are relatively thin (approximately 0.005–0.010 inches), the scroll bar sensors can be located in many different locations representing many different configurations on keyboard 120 in FIG. 1 or keyboard 230 in FIG. 2. Further, scroll bar sensors such as those shown in FIGS. 1 and 2 maybe located on different computer peripheral components as well as on the chassis 220 and monitor 210 in FIG. 2 and on the display 110 in FIG. 1.

Figure 3:
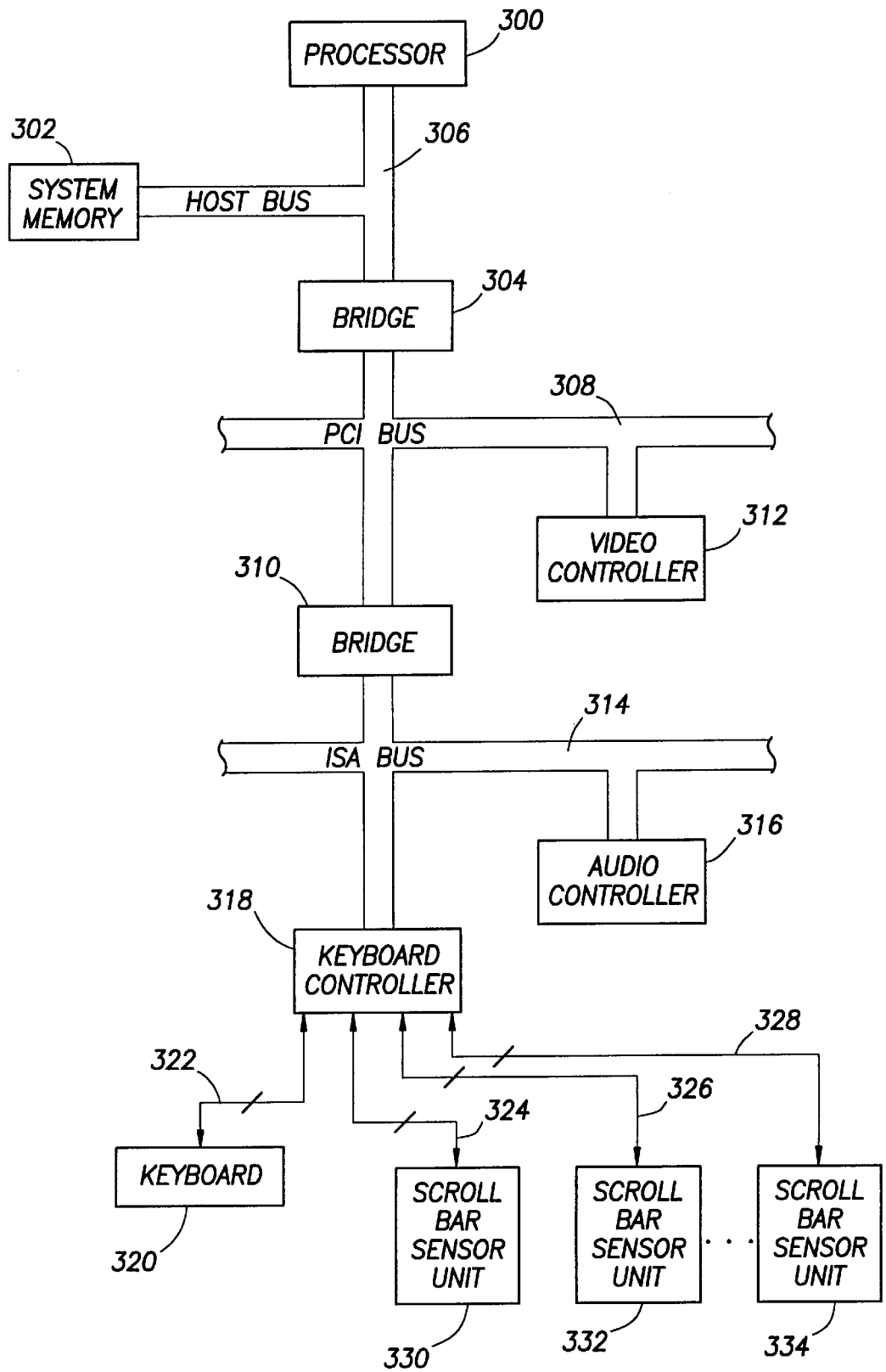
FIG. 3 is a block diagram of the preferred embodiments of FIGS. 1 and 2.

Referring now to FIG. 3, an exemplary computer system implementing the scroll bar sensors of FIGS. 1 and 2 preferably includes a processor 300, system memory 302, bridges 304, 310, a video controller 213, a keyboard controller 318, keyboard 320, and scroll bar sensor units 330, 332 and 334. A host bus 306 couples the processor 300 to system memory 302 and the bridge 304. The bridge 304 provides an interface between the host bus 306 and a peripheral component interconnect ("PCI") bus 308. Numerous PCI devices, such as video controller 312, may couple the PCI bus 308 in addition to bridge 310 which provides an interface between the PCI bus 308 and another bus, such as ISA bus 314. Various devices such as an audio controller 316 and a keyboard controller 318 couple to the ISA bus 314.

A keyboard 320 couples via lines 322 to the keyboard controller 318. Further, scroll bar sensor units 330, 332 and 334 include sensors as described above in conjunction with a detection circuit. Scroll bar sensor units 330–334 couple via lines 324, 326 and 328, respectively, to the keyboard controller 318. As such, the scroll bar sensors 122–126 interface to the processor 300 via bridges 304, 310 and keyboard controller 318. Keyboard controller 318 may include available keyboard controllers such as an 8051 family of microcontrollers manufactured by Philips or may include a custom design.

Figure 4:
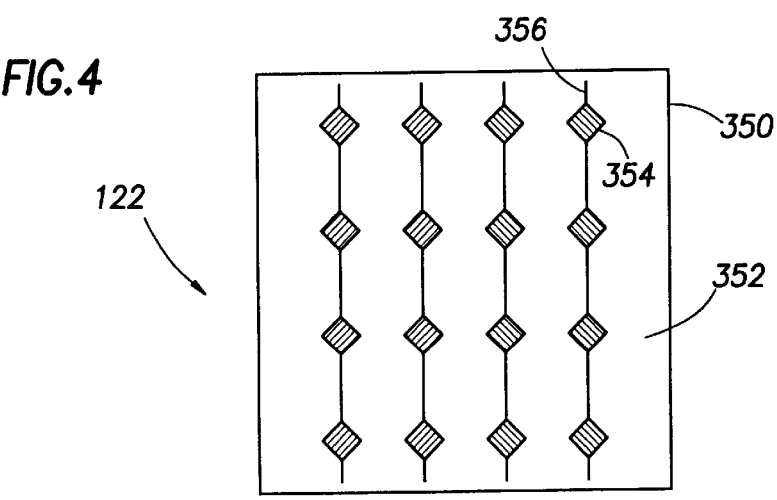
FIG. 4 is a top view of a touch pad in accordance with one embodiment of the invention.
Figure 5:
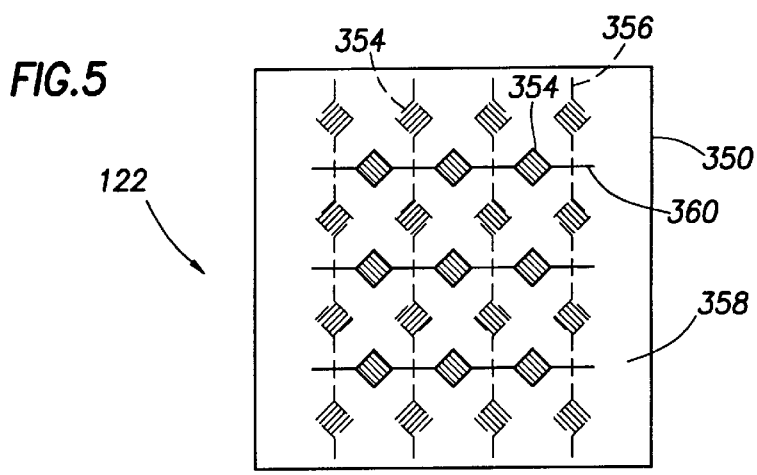
FIG. 5 is a bottom view of the touch pad of FIG. 4.

FIGS. 4 and 5 illustrated a technique for forming an exemplary capacitive touch pad, scroll bar sensor 122. Scroll bar sensor 122 includes a substrate 350 with a top surface 352 (FIG. 4) and a bottom surface 358 (FIG. 5). Top and bottom surfaces 352, 358 include a plurality of capacitive elements 354 formed in a diamond shape as shown, or other suitable shapes. The capacitive elements 354 on the top surface 352 of substrate 350 connect via conductive traces 356 in the direction shown in FIG. 4. The capacitive elements 354 on the bottom surface 358 of the substrate 350 connect via conductive traces 360. Preferably conductive traces 360 run in an orthogonal direction to the direction of conductive traces 356 although other orientations also are possible. In FIG. 5, the capacitive elements 354 and conductive traces 356 from the top surface 352 of the substrate are shown in dotted lines on the bottom surface 358 illustrating the relative location of the conductive traces and capacitive elements from the top and bottom surfaces 352 and 358.

A detection circuit (not shown) coupled to conductive traces 356 and 360 and detect the change in capacitance resulting from a user's finger being placed near or in contact with the capacitive elements 354. By detecting the x, y location of the localized capacitance changes, the electronics can determine the location of the finger on or near the sensor. Such detection circuits typically include charge integrator circuits, filters, sample and hold circuits, and other components, such as that shown in U.S. Pat. No. 5,374,787. Further, a single sensor processor chip (not shown) may connect to the conductive traces 356 and 360 for determining the location of a finger placed near the capacitive elements.

Numerous variations and modifications will become apparent to those skilled in the art once the above disclosure is fully appreciated. It is intended that the following claims be interpreted to embrace all such variations and modifications.

What is claimed is:

1. A computer system, comprising:

a display device on which information is displayed;

a processor coupled to said display device;

a keyboard unit coupled to said processor, said keyboard having a top surface wherein a plurality of keys are disposed, two side surfaces with each side surface disposed on opposite ends of the keyboard unit, and a front surface;

a first vertical scroll bar sensor physically separate from a pointing device and at least partially disposed on one of said side surfaces, said first scroll bar sensor adapted to scroll the information vertically on the display device; and a horizontal scroll bar sensor physically separate from a pointing device and at least partially disposed said front surface, said horizontal scroll bar sensor adapted to scroll the information horizontally on the display device.

2. The computer system as defined in claim 1, further comprising a second vertical scroll bar sensor physically separate from a pointing device and at least partially disposed on one of said side surfaces opposite that of the first vertical scroll bar, said second vertical scroll bar adapted to scroll the information vertically on the display device.

3. The computer system as defined in claim 2 wherein at least one of said scroll bar sensors has a portion disposed on said top surface with a remaining portion disposed on a respective side surface.

4. The computer system as defined in claim 3 wherein each of said scroll bar sensors comprises a capacitive touchpad.

5. A laptop computer system comprising:

a display device on which information can be displayed;

a keyboard assembly hinged to said display device, said keyboard assembly having a plurality of keys disposed on a top surface and having two side surfaces and a front surface;

a first up/down scroll sensor adapted to scroll information up and down on the display screen and in which at least a portion of said first up/down scroll sensor is formed on one of the side surfaces of the keyboard assembly; and a left/right scroll sensor adapted to scroll information left and right on the display screen and in which at least a portion of said left/right scroll sensor is formed on the front surface of the keyboard assembly.

6. The laptop computer system as defined in claim 5 further comprising a second up/down scroll sensor adapted to scroll information up and down on the display screen and in which at least a portion of said second up/down scroll sensor is formed on one of the side surfaces opposite the first up/down scroll sensor.

7. The laptop computer system as defined in claim 6 wherein at least one of the scroll sensors has a portion that is formed on the top surface of the keyboard assembly.

8. The laptop computer system as defined in claim 7 wherein each of said scroll bar sensors comprises a capacitive touchpad.

9. A computer keyboard physically separate from a chassis and connected to the chassis via a cable, comprising:

an upper surface having a plurality of keys disposed thereon;

two side surfaces formed on opposite sides of said keys, each of said side surfaces defining a short dimension of said keyboard;

a front surface intersecting each of the side surfaces, said front surface defining a long dimension of said keyboard;

a first vertical scroll bar sensor disposed proximate and substantially parallel to one of said side surfaces of the keyboard, said first vertical scroll bar having a portion disposed on a side surface;

a horizontal scroll bar sensor disposed proximate and substantially parallel to said front surface; and each of said first vertical scroll bar sensor and horizontal scroll bar sensor adapted to scroll information vertically and horizontally respectively on a display screen.

10. The computer keyboard as defined in claim 9 further comprising a second vertical scroll bar sensor disposed proximate and substantially parallel to one of said side surfaces opposite the first vertical scroll bar sensor, said second vertical scroll bar having a length substantially the same as the short dimension of the keyboard.

11. The computer keyboard as defined in claim 10 further comprising:

each of said first and second vertical scroll bar sensors having a portion thereof disposed on respective said side surfaces; and said horizontal scroll bar sensor having a portion thereof disposed on said front surface.

12. The computer keyboard as defined in claim 11 wherein each of said scroll bar sensors comprises a capacitive touchpad.

* * * * *